Patented Nov. 20, 1923.

1,475,157

UNITED STATES PATENT OFFICE.

HENRY HOWARD, OF CLEVELAND, OHIO, ASSIGNOR TO THE GRASSELLI CHEMICAL COMPANY, OF CLEVELAND, OHIO, A CORPORATION OF OHIO.

PROCESS OF MAKING ARTIFICIAL CRYOLITE.

No Drawing.  Application filed October 16, 1922.  Serial No. 594,981.

*To all whom it may concern:*

Be it known that I, HENRY HOWARD, a citizen of the United States, residing at Cleveland, in the county of Cuyahoga and State of Ohio, have invented certain new and useful Improvements in Processes of Making Artificial Cryolite, of which the following is a specification.

This invention relates to a process for the manufacturing of artificial cryolite, $Al_2F_6.6NaF$.

Artificial cryolite contains less impurities than natural cryolite and is therefore preferred for many purposes, for instance, for the manufacturing of enamels. The inexpensive commercial production of artificial cryolite is therefore desirable and is an object of my invention.

In the manufacture of artificial cryolite it is desirable to employ, as the source of the sodium component of the artificial cryolite, a cheap sodium compound such as, the sodium salts of the strong mineral acids, and as the source of the fluorine component of the artificial cryolite, hydrofluoric acid gas or an aqueous solution of the same.

One method heretofore employed for the manufacture of artificial cryolite consists in combining sodium chloride, aluminum fluoride and hydrofluoric acid according to the equation

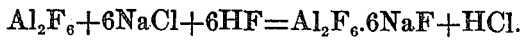
$Al_2F_6+6NaCl+6HF=Al_2F_6.6NaF+HCl.$

This method, while making use of a cheap sodium salt and hydrofluoric acid gas or an aqueous solution thereof, does not produce true artificial cryolite but produces a product which contains a considerably greater proportion of aluminum than is indicated by the formula $Al_2F_6.6NaF$.

I found that if artificial cryolite is formed in a reaction mixture which is substantially neutral or at least free from the bulk of the mineral acid generated by the action of hydrofluoric acid upon the sodium salt employed, i. e. sodium chlorid in the above mentioned reaction, artificial cryolite, the composition of which corresponds substantially to the formula $Al_2F_6.6NaF$, is formed.

My invention therefore comprises forming artificial cryolite, using as the source of sodium a cheap sodium salt of a strong mineral acid, by the combination of suitable reagents in a medium which is maintained substantially free of strong mineral acid.

The process, in general, comprises combining aluminum fluorid or reagents capable of forming aluminum fluorid, such as aluminum hydrate and hydrofluoric acid, with the sodium salt and hydrofluoric acid in quantity sufficient to convert the sodium of the sodium salt to sodium fluorid and a neutralizing agent in quantity sufficient to neutralize the acid generated by the action of the hydrofluoric acid upon the sodium salt.

A process in which the inexpensive sodium salts, such as sodium chlorid, sodium nitrate, or sodium sulfate or mixtures thereof are employed to supply the sodium component of the artificial cryolite, is preferred.

Several processes may be employed for carrying out the invention some of which are illustrated in the following examples.

*Example 1.*

I first prepare separate neutral solutions of aluminum fluorid and ammonium fluorid by dissolving aluminum hydrate and ammonia in separate batches of hydrofluoric acid solution. Or, if desired, a neutral solution containing both aluminum fluorid and ammonium fluorid may be prepared by dissolving one molecular equivalent of aluminum hydrate $(Al_2O_3.3H_2O)$ and six molecular equivalents of ammonia $(NH_3)$ in twelve molecular equivalents of hydrofluoric acid $(HF)$. The separate neutral solutions of aluminum fluorid and ammonium fluorid or the neutral solution containing both salts are then mixed with a neutral solution of a sodium salt, for example, sodium chlorid, in the proportions represented by the equation $Al_2F_6+6NH_4F+6NaCl=Al_2F_6.6NaF+6NH_4Cl$ whereby an artificial cryolite precipitate and a solution of ammonium chlorid are formed. The artificial cryolite is separated from the solution in any suitable manner and is washed and dried. The mother liquor and wash water are treated for the recovery of ammonium chlorid which forms a valuable by-product of the process.

Instead of preparing neutral solutions of aluminum fluorid, ammonium fluorid and the sodium salt as described above, the formation of the salts may take place in the reaction mixture in which the aluminum fluorid and the sodium fluorid combine to form the artificial cryolite. By operating in this manner hydrofluoric acid in the form of gas or aqueous solution, which is the commercial source of the fluorine constituent of the artificial cryolite, may be used directly and the separate production of a neutral fluorid from the hydrofluoric acid thus avoided.

*Example 2.*

I dissolve six molecular equivalents of a sodium salt such as sodium chlorid in six molecular equivalents of hydrofluoric acid solution and neutralize the hydrochloric acid generated with six molecular equivalents of ammonia and mix the resulting solution with a solution containing one molecular equivalent of aluminum fluorid ($Al_2F_6$). Or I may dissolve six molecular equivalents of a sodium salt such as sodium chlorid in twelve molecular equivalents of hydrofluoric acid, add six molecular equivalents of ammonia, that is, the quantity theoretically sufficient to neutralize the hydrochloric acid generated by the action of the hydrofluoric acid upon the sodium chlorid and then dissolve one molecular equivalent of aluminum hydrate in the solution. Or I may dissolve one molecular equivalent of aluminum hydrate in twelve molecular equivalents of hydrofluoric acid and add thereto either separate solutions containing respectively six molecular equivalents of ammonia and six molecular equivalents of a sodium salt, such as, sodium chlorid, or a single solution containing six molecular equivalents of sodium chlorid and six molecular equivalents of ammonia. A satisfactory procedure for carrying out the process is as follows:

In one vessel I prepare a solution of aluminum fluorid in hydrofluoric acid by dissolving one molecular equivalent of $Al_2O_3.3H_2O$ in twelve molecular equivalents of HF. In a separate vessel I prepare a solution of sodium chlorid in water containing six molecular equivalents of NaCl. The aluminum fluorid solution containing an excess of hydrofluoric acid sufficient to convert the sodium chlorid to sodium fluorid is then slowly added to the sodium chlorid solution with constant stirring simultaneously with the addition of ammonia to the mixture, the rate of addition of ammonia being regulated to maintain the reaction mixture slightly acid to avoid loss of ammonia until all of the aluminum fluorid solution has been added, whereupon enough ammonia is added to neutralize the reaction mixture. After the reaction is complete and the reaction mixture has been neutralized, the artificial cryolite is separated, washed and dried and the mother liquors and wash waters are treated for the recovery of ammonium chlorid. The composition of the artificial cryolite product corresponds substantially with the formula $Al_2F_6.6NaF$.

It will be apparent that if sodium salts other than sodium chlorid are used in the process the corresponding ammonium salts will result as by-products. For instance, if sodium nitrate is used the by-product will be ammonium nitrate. It is of course within the scope of my invention to employ impure sodium salts or mixtures of sodium salts.

It will be noted that in each of the several procedures outlined in the above examples the combination of sodium fluorid with aluminum fluorid to form artificial cryolite takes place in a substantially neutral solution and also that in each instance an inexpensive sodium salt of a strong mineral acid is employed as the source of the sodium component of the artificial cryolite. The process requires a neutralizing agent which should be inexpensive or which forms, by combination with the acid component of the sodium salt used, a valuable by-product, preferably both. A suitable neutralizing agent which answers these requirements is ammonia, preferably in the form of crude ammonia liquors.

The advantages of my process are (1) the production of substantially true artificial cryolite; (2) simple and inexpensive operation; (3) the use of inexpensive raw materials, to wit, crude hydrofluoric acid, crude ammonical liquors and inexpensive sodium salts; and (4) the production of valuable ammonium salts as by-products.

This application is a continuation in part of my application Serial No. 538,646, filed February 23, 1922.

I claim:

1. Process of making artificial cryolite which comprises reacting upon a sodium salt of a strong mineral acid with a solution of aluminum fluorid in hydrofluoric acid, and neutralizing the mineral acid generated in the reaction.

2. Process of making artificial cryolite which comprises reacting upon aluminum hydrate and a sodium salt of a strong mineral acid with hydrofluoric acid and neutralizing the mineral acid generated in the reaction.

3. Process of making artificial cryolite which comprises dissolving one molecular equivalent of aluminum hydrate ($Al_2O_3.3H_2O$) in twelve molecular equivalents of hydrofluoric acid and slowly adding the resulting solution to a solution of a sodium salt of a strong mineral acid containing six atomic equivalents of sodium simultaneously with the introduction of ammonia into said sodium salt solution at a rate sufficient to maintain the reaction mixture only slightly acid.

4. Process of making artificial cryolite which comprises reacting upon aluminum hydrate and a sodium salt of a strong mineral acid with hydrofluoric acid, neutralizing mineral acid as it is generated by means of ammonia, and separating and recovering the resulting artificial cryolite and ammonium salt of said mineral acid.

5. Process of making artificial cryolite which comprises, reacting upon a sodium salt of a strong acid with hydrofluoric acid in the presence of aluminum fluorid, and neutralizing the acid generated in the reaction.

6. Process of making artificial cryolite which comprises combining aluminum fluorid, ammonium fluorid and sodium nitrate in a substantially neutral reaction mixture.

7. Process of making artificial cryolite which comprises, adding hydrofluoric acid to a solution containing a sodium salt of a strong acid in the presence of aluminum fluorid, and maintaining the solution only slightly acid during the addition of the hydrofluoric acid by the addition of a neutralizing agent to the solution.

8. Process of making artificial cryolite which comprises, simultaneously adding a solution of aluminum fluorid in hydrofluoric acid and a solution of ammonia to a solution of a sodium salt of a strong acid.

9. Process as defined in claim 1 in which sodium nitrate is the sodium salt employed.

10. Process as defined in claim 2 in which sodium nitrate is the sodium salt employed.

11. Process as defined in claim 3 in which sodium nitrate is the sodium salt employed.

12. Process as defined in claim 4 in which sodium nitrate is the sodium salt employed and ammonium nitrate is the ammonium salt recovered.

13. Process as defined in claim 5 in which sodium nitrate is the sodium salt employed.

14. Process as defined in claim 7 in which sodium nitrate is the sodium salt employed.

15. Process as defined in claim 8 in which sodium nitrate is the sodium salt employed.

In testimony whereof, I affix my signature.

HENRY HOWARD.